United States Patent [19]
Deschamps et al.

[11] 3,793,506
[45] Feb. 19, 1974

[54] NAVIGATIONAL PROCESS AND DEVICE FOR PATH CONTROL

[75] Inventors: Jacques Désiré Deschamps, Saint-Cloud; Jacques Henri Emile Durand, Paris, both of France

[73] Assignee: Societe Nationale D'Etude Et De Construction De Moteur D'Aviation, Paris, France

[22] Filed: July 21, 1965

[21] Appl. No.: 474,539

[30] Foreign Application Priority Data
July 30, 1964 France .......................... 64.983689

[52] U.S. Cl. .......................................... 235/61.6 B
[51] Int. Cl. ............................................. G06k 1/18
[58] Field of Search ........... 343/5 DP, 5 MM, 7 TA; 235/61.11, 184, 61.6 A, 61.6 B

[56] References Cited
UNITED STATES PATENTS

| | | | |
|---|---|---|---|
| 2,876,562 | 3/1959 | Stieber | 235/61.6 A X |
| 3,038,656 | 6/1962 | Horwitz et al. | 235/61.6 B |

*Primary Examiner*—Malcolm F. Hubler
*Attorney, Agent, or Firm*—Fleit, Gipple & Jacobson

[57] ABSTRACT

A contour map reading and recording process wherein different colors, voltages, design characteristics or other physical features are imparted to increasing and decreasing altitude sections of the map as discriminated along a selected reading direction across it, said different physical features being sensed while moving across said map along said reading direction and translated into binary-coded data to be stored in a memory.

7 Claims, 3 Drawing Figures

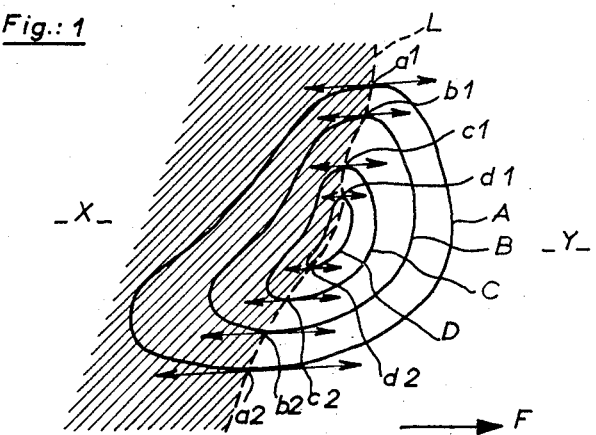
Fig.: 1
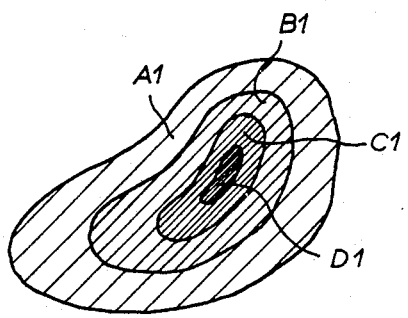
Fig.: 2
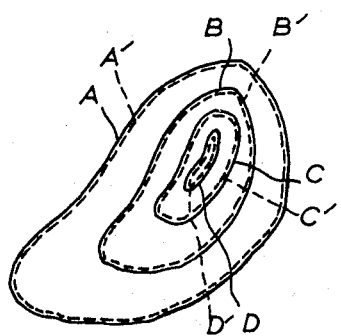
Fig.: 3

NAVIGATIONAL PROCESS AND DEVICE FOR PATH CONTROL

In the co-pending patent application Ser. No. 347,996 filed on Feb. 25, 1964, there is described a process for controlling the path of a moving body by comparison of a relief plot of a surveyed zone with a sounding plot obtained during passage of the body over said zone. This process comprises the steps of storing a plurality of patterns of binary digits wherein each pattern corresponds to a different and known strip of the said zone, said binary digits being representative of the algebraical sign of the difference in heights between predetermined points of said strip, translating said sounding plot into a pattern of binary digits representative of the algebraical sign of the difference between readings taken in spaced conformity with said predetermined points, and correlating the translated pattern with each of the stored patterns of binary digits and thus obtaining the degree of concordance thereof.

This co-pending application also describes a path control device which, from stored altitude data and from measured altitude data, computes altitude differences between successive sampling points, deduces two series of binary digits representing the direction of slope of the zone, and correlates the two series thus obtained.

The relief of the surveyed zone may be deduced from a large-scale map (e.g. at 1/25000 scale) or stereoscopic photographs; equidistant contour lines, say every 5 or 10 metres, may be traced thereon.

The main object of the present invention is to translate into binary digits the relief shown on the map, in order to store them in a memory, taking into account the facts that the selected zone may be reached by the body in motion along various courses extending over 360° and that the information of interest is not the actual altitude of the terrain but rather the direction of slope along the path considered.

In accordance with this invention, such a map with its relief displayed by contour lines is prepared so as to allow automatic reading by any convenient pick-up or detecting means responsive to variations in tints, colors, voltages or the like, determined by said contour lines.

In the accompanying drawings, FIGS. 1, 2 and 3 illustrate diagrammatically various manners of fitting up contour line maps, according to the present invention.

With reference to FIG. 1, assuming that the moving body crosses the map in a given direction shown by arrow F, the locus L of the points $a1, a2, b1, b2, c1, c2, d1, d2$ at which the tangent to the contour lines A, B, C, D is parallel to the path direction F, marks the boundary of the regions X having an upward slope and the regions Y having a downward slope.

In an embodiment of the invention, the ascending zones X and the descending zones Y will be distinguished by a black and a white color respectively. The map of the considered area will thus be converted into a black and white model in accordance with the slope direction of the terrain along the considered path direction F. Obviously the same model is still usable with regard to the opposite path direction by merely reversing the colors.

Such a diagram will be set up for every direction of motion which is contemplated, within 180°.

An advantageous method of using such models is to reduce them to the size of microfilms which can be read through the cathode ray tube scanning process known in television as "flying-spot".

In an alternative form of the invention, the contour lines of the map are reproduced as a printed circuit by photogravure or other like process. Every conductor line representing a contour line will receive a bias voltage proportional to the altitude to which the contour line corresponds. A detector or pick-up device which moves over this circuit along the same direction as the displacement axis F, will thus "read" the altitude encountered.

It is to be noted that the relation between the bias voltage of a conducting line of the printed circuit and the altitude of the corresponding contour line, does not necessarily have to be one of strict proportionality, since the only useful information is merely that an increasing voltage corresponds to an increasing altitude and a decreasing voltage to a decreasing altitude (or inversely).

Another embodiment of the invention shown in FIG. 2 consists in giving to the zones A1, B1, C1, D1 comprised between successive contour lines, colors which are darker and darker as the mean altitude is higher and higher. Thus, just as before, a detector or pick-up device (a photocell in the present case) will "read" the altitude encountered.

It is also possible—and this seems even preferable—to duplicate each contour line A, B, C, D drawn for example in blue over a neutral color map by a line A', B', C', D' (see FIG. 3) of different color, red for example, positioned on the side of increasing altitudes. A feeler or detector responsive to these tints, which crosses a contour line in the blue-red direction will deliver the "upward slope" information; if it crosses a contour line in the red-blue direction, it will deliver the "downward slope" information.

The main advantage of the present invention lies in the possibility of accomodating on board the body in motion a relief map fitted up as described above, which allows "reading" this map automatically, on the way, by means of an adequate detector, the relative arrangement of the map and detector being angularly adjustable in accordance with the course of the body.

What we claim is:

1. A process for automatically recording binary-coded data representative of the relief of a surveyed terrain designed as a contour map, said process comprising the steps of:

selecting a reading direction across said contour map, discriminating thereon, along said direction, increasing altitude sections from decreasing altitude sections, imparting different physical features to said increasing altitude sections and to said decreasing altitude sections, sensing said different physical features while moving across said contour map along said reading direction, translating said sensed different physical features into binary-coded data by emitting one binary digit upon an increasing altitude being sensed and the other binary digit upon a decreasing altitude being sensed, and storing said binary-coded data.

2. A process as claimed in claim 1, wherein said physical features are tints.

3. A process as claimed in claim 2, wherein said tints are black and white, one of these two tints being applied to increasing altitude sections and the other to decreasing altitude sections.

4. A process as claimed in claim 3, comprising the steps of designing in black and white a plurality of different contour maps of the same surveyed terrain in accordance with a plurality of different reading directions, photographing said contour maps, reproducing the photographs thus obtained in the form of a microfilm, and reading the micro-photographs thereon.

5. A process as claimed in claim 4, wherein the step of reading the micro-photographs is carried out by the so-called "flying-spot" cathode ray tube scanning.

6. A process as claimed in claim 1, wherein said physical features are bias voltages of varying magnitudes according as the altitudes designed on said contour map vary.

7. A process as claimed in claim 6, wherein said contour map is a printed circuit with electric conductive lines representing contour lines of the map, and said bias voltages are applied to said lines.

* * * * *